Figure 1:
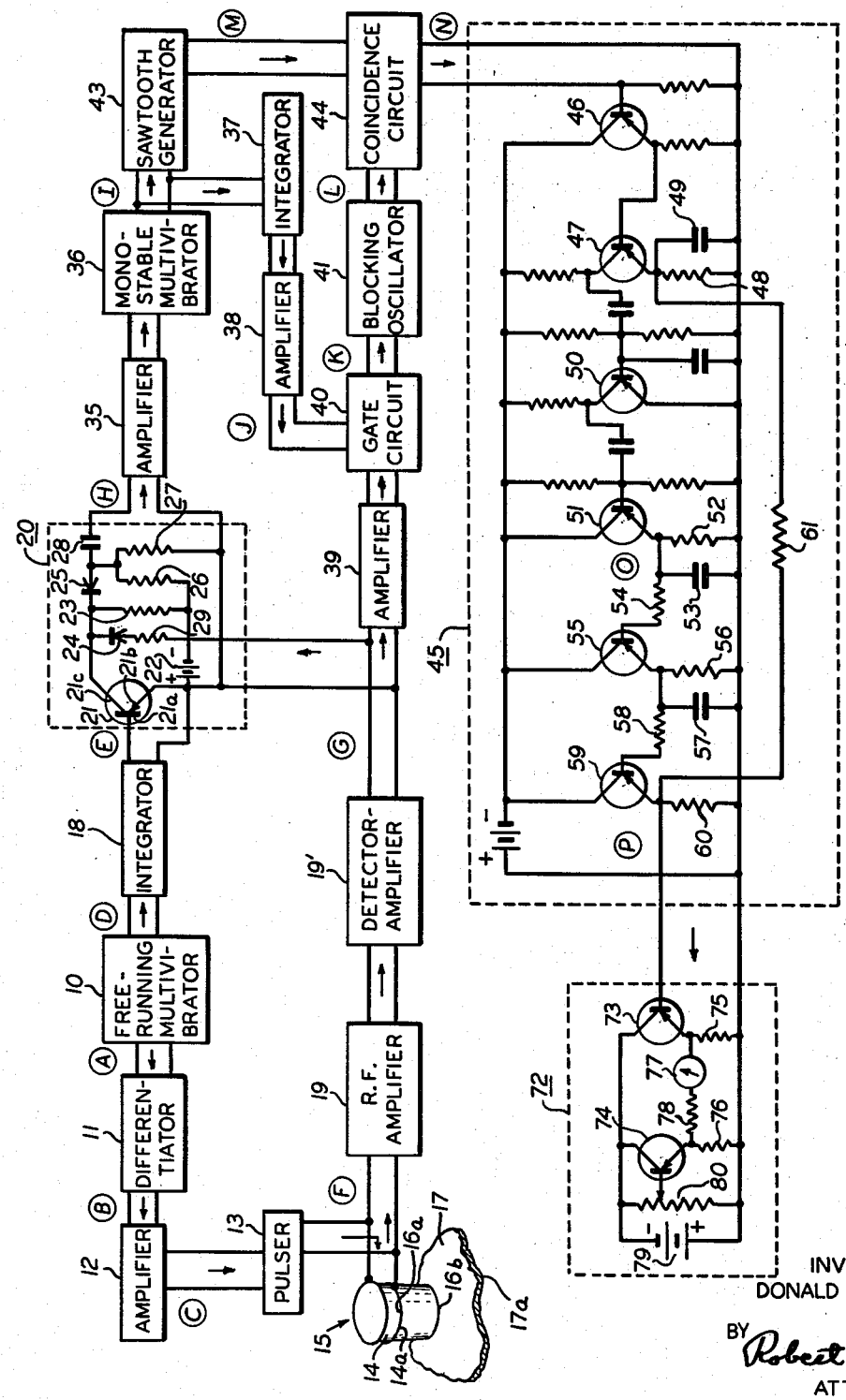

INVENTOR
DONALD C. ERDMAN
BY Robert Hockfell
ATTORNEY.

May 19, 1964 D. C. ERDMAN 3,133,438
ULTRASONIC TESTING APPARATUS
Filed Nov. 21, 1960 2 Sheets-Sheet 2

INVENTOR
DONALD C. ERDMAN
BY Robert Hoopfield
ATTORNEY.

United States Patent Office 3,133,438
Patented May 19, 1964

3,133,438
ULTRASONIC TESTING APPARATUS
Donald C. Erdman, Pasadena, Calif., assignor, by mesne assignments, to Automation Industries, Inc., El Segundo, Calif., a corporation of California
Filed Nov. 21, 1960, Ser. No. 70,598
9 Claims. (Cl. 73—67.9)

This invention relates to ultrasonic testing apparatus, and more particularly pertains to new and improved apparatus for ultrasonic inspection or testing especially adapted to provide accurate indications of the thickness of relatively thin materials.

In certain applications of ultrasonic inspection apparatus of the pulse-echo type, it is desirable to provide direct readings of the thickness of a material under investigation instead of a pulse versus time display as, for example, provided by a cathode-ray tube. While direct-reading instruments have been constructed heretofore in the inspection of relatively thin objects the pulse versus time relationships become exceedingly small and accurate indications may not always be obtained.

It is, therefore, an object of the present invention to provide new and improved ultrasonic inspection apparatus especially adapted to measure relatively thin objects.

Another object of the present invention is to provide new and improved ultrasonic inspection apparatus affording accurate, direct readings of the thickness of a test object.

Briefly stated, ultrasonic inspection apparatus embodying the present invention comprises pulser means for deriving electrical signal pulses during repetitive intervals spaced in time from one another by reception intervals and a search unit including transducer means electrically coupled to the pulser means for converting the aforesaid electrical signal pulses to ultrasonic wave energy pulses propagating from a surface thereof. The transducer means also converts ultrasonic wave energy pulses that are incident on the aforesaid surface to electrical signal pulses and the search unit also includes an acoustic delay element. The delay element has one surface acoustically coupled to the aforesaid surface of the transducer means and another surface adapted to be acoustically coupled to an object undergoing inspection. The apparatus further comprises first and second gate circuits each of which includes input, output and control circuit portions. The gate circuits are normally inoperative to translate electrical signals between their input and output circuit portions; but each is adapted to be operatively conditioned in response to an electrical signal at the control circuit portion thereof. A replica of electrical signal pulses derived by the transducer means is supplied to the input circuit portion of each of the gate circuits and means are provided for deriving control pulses for application to the control circuit portions of gate circuits. The control pulses applied to the first gate circuit are in synchronism with the electrical signal pulses from the pulser, and each occurs entirely during the corresponding reception interval. The apparatus further comprises timer means responsive to the particular electrical signal pulse first to occur at the output circuit portion of the first gate circuit during each of the reception intervals for deriving timing pulses. Each timing pulse is thus initiated in synchronism with the aforesaid first electrical signal pulse, and it terminates during the corresponding reception interval. Electrical delay means coupled to the timer means provides the control pulses that are supplied to the second gate circuit. Each of the latter control pulses is initiated at a time delayed from the initiation of a corresponding timing pulse by a selected interval, and each terminates during the corresponding reception interval. The apparatus additionally comprises utilization means responsive to the timing pulses and to an electrical signal at the output circuit portion of the gate circuit. In the operation of the apparatus just described the time between an echo from the interface and between the delay element and the test object, and the first reflection from the back surface of, or a reflecting surface within the test object, is effectively measured and a high degree of accuracy is achieved in measuring relatively thin objects.

In accordance with another aspect of the present invention the apparatus comprises means responsive to the timing pulses for deriving a sequence of time-varying signals each having an amplitude changing in a predetermined relation with time during the corresponding timing pulse. Means responsive to the time-varying signals and to the first signal to occur at the output circuit portion of the second gate circuit during the corresponding reception interval provides output pulses. Each output pulse has an amplitude representative of the time of occurrence of the aforesaid first signal, and the utilization means is responsive to such output pulses.

Figure 2:
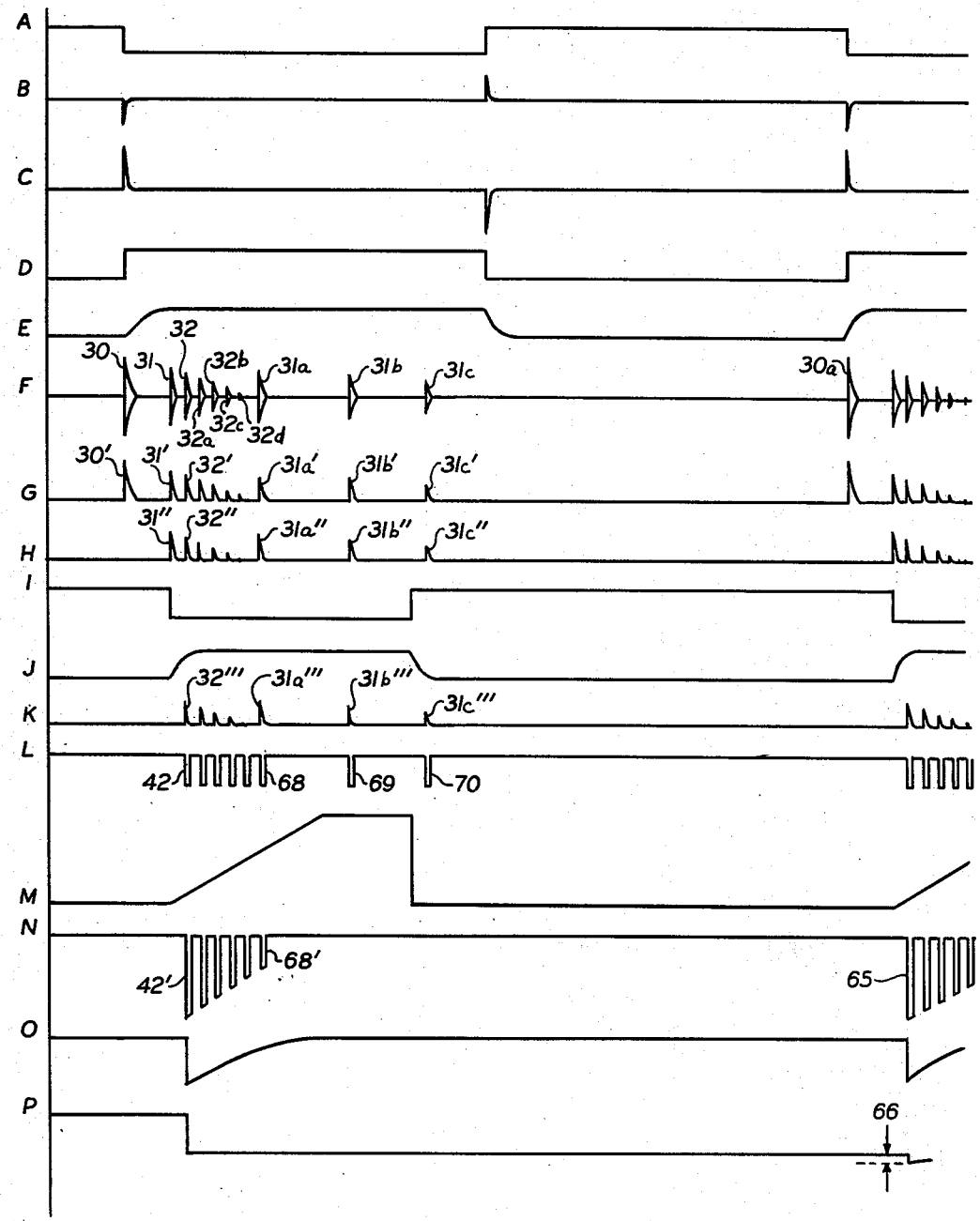

The novel features of the present invention are set forth in more particularity in the appended claims. The present invention, both as to its organization and manner of operation, together with further objects and advantages thereof, may best be understood by reference to the following description taken in connection with the accompanying drawings in which:

FIG. 1 is a schematic diagram, partly in block form, of apparatus embodying the present invention; and FIG. 2 includes a series of wave forms drawn to a common time-scale and in which the letters A through P represent the particular wave forms which appear at circuit portions of the apparatus of FIG. 1 designated by the same letters.

In FIG. 1 of the drawings, apparatus constructed in accordance with the present invention is shown to comprise a free-running multivibrator 10. The multivibrator 10 controls or synchronizes the operation of the various circuits to be described hereinafter and it may be set for any desired repetition frequency. For example, the time from one cycle to the next may be four thousand microseconds. The multivibrator generates a wave of rectangular shape, such as shown in FIG. 2A and that wave is supplied to a differentiator 11. The differentiator provides pulses, as illustrated in FIG. 2B, which are supplied to an amplifier 12 whose output is represented in FIG. 2C. The positive pulses in FIG. 2C control or trigger a pulser 13 which supplies corresponding pulses or bursts of radio-frequency energy to a transducer 14, such as a piezoelectric crystal. The crystal 14 may be constructed of any known material, as quartz, lithium sulfate, or the like. The transducer, of course, has a natural resonant frequency, and the radio frequency signal supplied by pulser 13 is adjusted to it. For example, operation at 5 megacycles per second is suitable.

It is evident that the pulser 13 derives electrical signal pulses during repetitive intervals spaced in time from one another by reception intervals and that the transducer 14 converts these electrical signal pulses to ultrasonic wave energy pulses propagating from its lower surface 14a. As is well known, the transducer 14 also converts ultrasonic wave energy pulses incident on surface 14a to electrical signal pulses. Transducer 14 is part of a search unit 15 which also includes an acoustic delay element 16 having its upper surface 16a in contact with and thus acoustically coupled to surface 14a of the transducer 14 and its lower surface 16b adapted to be acoustically coupled to an object 17 undergoing inspection.

Multivibrator 10 provides another rectangular pulse signal similar to that represented in FIG. 2A, but of opposite phase. This oppositely-phased signal, represented in FIG. 2D, is supplied to an integrator 18 which provides a time delayed signal represented in FIG. 2E which is supplied to a first gate circuit 20.

Gate circuit 20 includes a transistor 21 having a base 21a, an emitter 21b and a collector 21c. A control circuit for the gate circuit 20 includes base 21a and emitter 21b, and connections from integrator 18 extends to these elements. Collector current is supplied by a battery 22 through a load resistor 23.

Gate circuit 20 further comprises diodes 24 and 25 connected in back-to-back relation, the common connection between the diodes being connected to collector 21c. A pair of resistors 26 and 27 form a voltage divider across battery 22 and a connection between them extends to diode 25. An output circuit for the gate 20 includes collector 21c, diode 25, a coupling condenser 28, and emitter 21b.

An input circuit for the gate 20 is comprised of emitter 21b and a coupling resistor 29 which is in series with diode 24. The circuit is arranged so that transistor 21 draws collector-base current and thus forms a relatively low impedance shunt whereby the circuit is normally inoperative to translate electrical signals between its input and output circuit portions. In other words, the voltage at the control circuit is sufficiently negative to clamp transistor 21; however, when this voltage is reduced sufficiently, i.e. becomes more positive, the transistor is released. Thus in the presence of a pulse, such as shown in FIG. 2E, circuit 20 is operatively conditioned.

In response to an electrical signal pulse from pulser 13, an ultrasonic signal pulse of radio frequency energy is supplied both to the transducer 14 and to a radio-frequency amplifier 19 that is also coupled to the transducer. The envelope of that pulse is represented by numeral 30 in FIG. 2F. Transducer 14 converts the signal pulse into ultrasonic wave energy which propagates through the delay element 16 and into the test object 17.

A reflection from the lower surface 16b of delay element 16 produces a signal at the transducer 14 such as represented by wave peak 31 in FIG. 2F. A signal from the lower surface 17a of test object 17 produces wave peak 32 while successive reflections in the test object are represented by peaks 32a–32d. Also represented in FIG. 2F are successive reflections 31a–31c from within the delay element 16. The next successive, emitted pulses, represented by numeral 30a, initiates another cycle of operation.

After amplification in amplifier 19, a replica of the signal of FIG. 2F is supplied to a detector-amplifier 19' which provides the detected modulation envelope, as illustrated in FIG. 2G. The latter signal is supplied to the input circuit of gate 20, but because of the delay caused by integrator 18, gate 20 is not operatively conditioned until after the occurrence of initial pulse 30'. Accordingly, the wave of FIG. 2H is supplied to an amplifier 35 which is connected to a mono-stable multivibrator 36.

The multivibrator is normally quiescent, and is triggered by the first pulse supplied to its input circuit. It is adjusted to provide a rectangular pulse of suitable duration determined in accordance with the range of anticipated thicknesses to be measured. Thus, with reference to FIGS. 2H and 2I, the multivibrator is triggered by pulse 31" to provide a rectangular pulse which terminates before the end of the reception interval. The latter pulse is supplied to an integrator 37, in turn, coupled to an amplifier 38 and the amplified, delayed pulse is represented in FIG. 2J.

Detector-amplifier 19' supplies the signal of FIG. 2G to an amplifier 39 that is coupled to the input circuit of another gate circuit 40 which may be of any well known type, or which may be of the same type as gate circuit 20. Gate circuit 40 is normally inoperative to translate signals between its input and output circuits, and in response to a control pulse (FIG. 2J) supplied by amplifier 38, it is operatively conditioned to supply the signal of FIG. 2K to its output circuit. Because of the delay caused by integrator 37, pulse 31" of FIG. 2H is not translated. However, pulse 32" and succeeding pulses (as shown in FIG. 2K) are supplied to a blocking oscillator 41 which is triggered by each of the incoming pulses. The blocking oscillator provides pulses which correspond in time to the applied pulses, but which are of constant amplitude and duration, as shown in FIG. 2L. Thus, in response to pulse 32" pulse 42 is developed which is of the same amplitude and duration as successive pulses.

The timing wave of FIG. 2I is also supplied to a sawtooth generator 43 which provides a time-varying voltage, such as represented in FIG. 2M. The latter voltage and the signal from blocking oscillator 41 are combined in a coincidence circuit 44 which converts the applied group of pulses to another group of pulses whose amplitudes are proportional to the timing relationship of the applied pulses. Thus, the pulse signal of FIG. 2N is derived.

In order to obtain indications of the amplitude of the first pulse to occur in the sequence of pulses of FIG. 2N, the apparatus further comprises a pulse selector circuit 45. The selector 45 includes an input transistor 46 connected as an emitter-follower which is directly coupled to a transistor 47 operated as an amplifier. Transistor 47 has a resistor 48 in series with its emitter, and a capacitor 49 is in parallel with resistor 48. Network 48, 49 is in a feed-back circuit to be described more fully hereinafter.

The amplifier, which includes transistor 47, is capacitively coupled to another amplifier including a transistor 50, in turn, capacitively coupled to an emitter-follower transistor 51. Transistor 51 includes an emitter resistor 52 shunted by a condenser 53. The time constant of circuit 52, 53 is arranged so as to derive a pulse voltage which corresponds to the pulse voltage applied to the base of the transistor but of longer duration. In other words, transistor 51 is in a pulse-stretcher circuit. A coupling resistor 54 is connected between the emitter of transistor 51 and the base of another transistor 55. Transistor 55 is in an emitter-follower circuit operated as pulse-stretcher by virtue of a resistor 56 and a capacitor 57 in its emitter circuit. The time constant of the circuit which includes resistor 56 and capacitor 57 is selected so that pulses of extended duration are obtained, and these pulses are supplied via a coupling resistor 58 to another transistor 59 operated as an emitter-follower. Transistor 59 comprises an output stage for the pulse-selector circuit 45 and the voltage which appears across a resistor 60 that is in series with the emitter is supplied through a coupling resistor 61 to junction between network 48, 49 and the emitter of transistor 47. Thus a degenerative feed-back circuit extends from the output stage to the signal translating circuit which includes transistor 47.

In the operation of selector 45, pulses, such as shown in FIG. 2N, are applied to transistor 46 and the first to occur in the sequence, namely pulse 42', produces a signal that is translated by the successive stages and fed-back via the resistor 61 with sufficient amplitude to cut off the transistor 47. Accordingly, further signals are not passed by the transistor 47. The amplified replica of pulse 42' is applied to transistor 51 which, by reason of the presence of capacitor 53, functions as a capacitive-type peak-reading circuit. Accordingly, the voltage which appears across capacitor 53 is proportional to the amplitude of pulse 42'. However, owing to the relatively slow discharge of the capacitor, the resulting signal is of the type represented by wave 0 of FIG. 2. The latter signal is applied to transistor 55 which, because of the presence of capacitor 57, functions as another peak-reading circuit in cascade with the first, and the voltage which appears at capacitor 57 is proportional to the amplitude of signal applied to transistor 55. Thus, a wave of the type illustrated in FIG. 2P is derived. The time constants of the circuit are large enough so that the voltage at condenser 57 is maintained substantially constant while its amplitude is proportional to the amplitude of the first pulse 42' in the sequence of FIG. 2N. However, the time constants are sufficiently short that the voltage decreases to a value below that necessary to disable translating stage 46 prior to the occurrence of the first pulse in the next sequence, such as represented by pulse 65 in FIG. 2N. In other words, the voltage at resistor 60, which corresponds to the voltage at condenser 57, decreases by an amount represented by numerals 66 in FIG. 2P. That decrease is sufficient to render translator 46 operative again, prior to the occurrence of pulse 65. Thus, for any change in amplitude as between pulses 42' and 65 (produced by examining an object of different thickness) the voltage at resistor 60 will change accordingly.

With the circuit just described, if the search unit 15 is not in contact with the test object, certain pulses of FIG. 2F, namely pulses 32, 32a, 32b, 32c and 32d, do not occur. The pulses 31, 31a, 31b and 31c, however, do appear because of delay element 16. Under these circumstances, only the pulses 31a''', 31b''' and 31c''' of FIG. 2K are supplied to blocking oscillator 41 which thus produces only pulses 68, 69 and 70. Coincidence circuit 34 responds to pulse 68 of FIG. 2L and to the wave of FIG. 2M to produce a pulse 68' whose amplitude represents the distance between surfaces 16a and 16b of delay element 16. This condition can be compared to a situation in which the test object has zero thickness and it will be seen that under this condition, a minimum voltage is derived by pulse-selector 45. In other words, the voltage supplied to a utilization circuit, such as an indicator 72, varies inversely with thickness.

The indicator 72 includes transistors 73 and 74 connected as emitter-followers. Individual emitter resistors 75, 76 are provided and a voltmeter 77 provided with a protective resistor 78 is connected between the emitters. The voltage from pulse selector circuit 45 is applied to the base of transistor 73, the lower end of its emitter resistor 75 being connected to a reference potential. An adjustable voltage furnished by battery 79 and a potentiometer 80 is supplied to the base of transistor 74. Potentiometer 80 is adjusted so that in the absence of a test object, meter 77 undergoes full-scale deflection. Of course, when the search unit 15 is placed in operative relation with a test object, the voltage supplied by circuit 45 will have an amplitude (in a negative sense) proportional to the thickness of the test object and the meter will be deflected down-scale by an appropriate amount.

It is apparent that by the use of a saw-tooth generator 43 providing a wave (FIG. 2M) of good linearity a linear scale on meter 77 will indicate thickness directly.

Although the apparatus has been described in connection with the measurement of thickness, it is obvious that the distance between the lower surface 16b of delay element 16 and a discontinuity within a test object will provide an indication of the distance to the discontinuity. In other words, the apparatus may be employed for inspecting materials for flaws, such as cracks, voids, or the like, as well as for measuring thickness.

From the foregoing description it is evident that apparatus constructed in accordance with the present invention may be employed satisfactorily to provide direct indications of the thickness of materials under investigation. Further, since multivibrator 36 provides a timing wave which is actuated by the interface between surface 16b of delay element 16 and test object 17, any instability in pulser 13 or related circuitry will not adversely affect the accuracy of the measurements. Stated in another way, thickness or distance measurements are related to surface 16a rather than to the time of the occurrence of the pulses from pulser 13, thus providing increased stability. Moreover, pulse selector circuit 45 is capable of responding to pulses of comparatively short duration, and good definition is obtained for closely spaced pulses resulting from thin materials. Thus, relatively thin materials may be measured with greater accuracy than heretofore possible in direct reading apparatus.

As used herein the term "acoustic delay element" includes liquid as well as solid materials and thus is not to be construed to be limited to either form of material.

While a particuflar embodiment of the present invention has been shown and described, it is apparent that changes and modifications may be made without departing from this invention in its broader aspects, and, therefore, the aim in the appended claims is to cover all such changes and modifications as fall within the true spirit and scope of this invention.

What is claimed is:

1. Ultrasonic inspection apparatus comprising: pulser means for deriving electrical signal pulses during repetitive intervals spaced in time from one another by reception intervals; a search unit including transducer means electrically coupled to said pulser means for converting the aforesaid electrical signal pulses to ultrasonic wave energy pulses propagating from a surface thereof and for converting ultrasonic wave energy pulses incident on said surface to electrical signal pulses and including an acoustic delay element having one surface acoustically coupled to the aforesaid surface of said transducer means and another surface adapted to be acoustically coupled to an object undergoing inspection; first and second gate circuits, each including input, output and control circuit portions and being normally inoperative to translate electrical signals between said input and said output circuit portions, but adapted to be operatively conditioned in response to an electrical signal at said control circuit portion; means for supplying a replica of electrical signal pulses derived by said transducer means to said input circuit portion of each of said gate circuits; means for deriving first control pulses initiated in synchronism with the electrical signal pulses from said pulser means for application to said control circuit portion of said first gate circuit, each occurring substantially only during one of said reception intervals; means responsive to the first electrical signal pulse to occur during each of said reception intervals at said output circuit portion of said first gate circuit for deriving time varying pulses each initiated in synchronism with the aforesaid first electrical signal pulse and terminating during the corresponding reception interval; means including electrical delay means connected to the output of the first gate circuit for deriving additional control pulses, each initiated at a time delayed from a corresponding one of said first electrical signal pulses by a selected interval and terminating during the corresponding reception interval; means for supplying said additional control pulses to said control circuit portion of said second gate circuit; and utilization means responsive to both the output of said second gate circuit and said time varying pulses and arranged to detect the time lapse between initiation of each of said time varying pulses and the succeeding electrical signal at the output circuit portion of said second gate circuit and provide an indication thereof.

2. Ultrasonic inspection apparatus comprising: a signal generator providing repetitive pulses of essentially rectangular form; a differentiator coupled to said signal generator for deriving a pulse of given polarity in response to the initiation of one of said pulses; pulser means coupled to said differentiator for deriving electrical signal pulses of radio-frequency during repetitive intervals spaced in time from one another by reception intervals each such reception interval being initiated in response to one of said pulses from said differentiator; a search unit including transducer means electrically coupled to said pulser means for converting the aforesaid electrical signal pulses to ultrasonic wave energy pulses propagating from a surface thereof and for converting ultrasonic wave energy pulses incident on said surface to electrical signal pulses and including an acoustic delay element having one surface acoustically coupled to the aforesaid surface of said transducer means and another surface adapted to be acoustically coupled to an object undergoing inspection; first and second gate circuits, each including input, output and control circuit portions and being normally inoperative to translate electrical signals between said input and said output circuit portions, but adapted to be operatively conditioned in response to an electrical signal at said control circuit portion; means for supplying a replica of electrical signal pulses derived by said transducer means to said input circuit portion of each of said gate circuits; electrical delay means coupled to said signal generator for deriving first control pulses for application to said control circuit portion of said first gate circuit, initiated in synchronism with the repetitive pulses from said signal generator but occurring substantially only during one of said reception intervals; means responsive to the first electrical signal pulse to occur during each of said reception intervals at said output circuit portion of said first gate circuit for deriving time varying pulses each initiated in synchronism with the aforesaid first electrical signal pulse and terminating during the corresponding reception interval; means including electrical delay means connected to the output of said first gate circuit for deriving additional control pulses, each initiated at a time delayed from a corresponding one of said first electrical signal pulses by a selected interval and terminating during the corresponding reception interval; means for supplying said additional control pulses to said control circuit portion of said second gate circuit; and utilization means responsive to both the output of said second gate circuit and said time varying pulses and arranged to detect the time lapse between initiation of each of said time varying pulses and the succeeding electrical signal at the output circuit portion of said second gate circuit and provide an indication thereof.

3. Ultrasonic inspection apparatus comprising: pulser means for deriving electrical signal pulses during repetitive intervals spaced in time from one another by reception intervals; a search unit including transducer means electrically coupled to said pulser means for converting the aforesaid electrical signal pulses to ultrasonic wave energy pulses propagating from a surface thereof and for converting ultrasonic wave energy pulses incident on said surface to electrical signal pulses and including an acoustic delay element having one surface acoustically coupled to the aforesaid surface of said transducer means and another surface adapted to be acoustically coupled to an object undergoing inspection; a first gate circuit including a transistor having a base, an emitter and a collector and including a pair of diodes connected in back-to-back relation with the common connection therebetween being connected to said collector, said base and said emitter being included in a control circuit portion for said gate circuit, one of said diodes and said emitter being included in an input circuit portion for said gate, and the remaining of said diodes and said emitter being included in an output circuit portion for said gate circuit; a second gate circuit including input, output and control circuit portions, each of said gate circuit being inoperative to translate electrical signals between said input and said output circuit portions, but adapted to be operatively conditioned in response to an electrical signal at said control circuit portion; means for supplying a replica of electrical signal pulses derived by said transducer means to said input circuit portion of each of said gate circuits; means for deriving first control pulses for application to said control circuit portion of said first gate circuit, initiated in synchronism with the repetitive pulses from said pulser means each occurring substantially only during one of said reception intervals; means responsive to the first electrical signal pulse to occur during each of said reception intervals at said output circuit portion of said first gate circuit for deriving time varying pulses each initiated in synchronism with the aforesaid first electrical signal pulse and terminating during the corresponding reception interval; means including electrical delay means connected to the output of said first gate circuit for deriving additional control pulses, each initiated at a time delayed from a corresponding one of said first electrical signal pulses by a selected interval and terminating during the corresponding reception interval; means for supplying said additional control pulses to said control circuit portion of said second gate circuit; and utilization means responsive to both the output of said second gate circuit and said time varying pulses and arranged to detect the time lapse between initiation of each of said time varying pulses and the succeeding electrical signal at the output circuit portion of said second gate circuit and provide an indication thereof.

4. Ultrasonic inspection apparatus comprising: pulser means for deriving electrical pulses during repetitive intervals spaced in time from one another by reception intervals; a search unit including transducer means electrically coupled to said pulser means for converting the aforesaid electrical signal pulses to ultrasonic wave energy pulses propagating from a surface thereof and for converting ultrasonic wave energy pulses incident on said surface to electrical signal pulses and including an acoustic delay element having one surface acoustically coupled to the aforesaid surface of said transducer means and another surface adapted to be acoustically coupled to an object undergoing inspection; first and second gate circuits each including input, output and control circuit portions and being normally inoperative to translate electrical signals between said input and said output circuit portions, but adapted to be operatively conditioned in response to an electrical signal at said control circuit portion; means for supplying a replica of electrical signal pulses derived by said transducer means to said input circuit portion of each of said gate circuits; means for deriving first control pulses initiated in synchronism with the electrical signal pulses from said pulser means for application to said control circuit portion of said first gate circuit, each occurring substantially only during one of said reception intervals; timing pulse means responsive to the first electrical signal pulse to occur during each of said reception intervals at said output circuit portion of said first gate circuit for deriving timing pulses each initiated in synchronism with the aforesaid first electrical signal pulse and terminating during the corresponding reception interval; means including electrical delay means connected to the output of said timing pulse means for deriving additional control pulses, each initiated at a time delayed from a corresponding one of said first electrical signal pulses by a selected interval and terminating during the corresponding reception interval; means for supplying said additional control pulses to said control circuit portion of said second gate circuit; means responsive to said timing pulses for deriving a sequence of time-varying signals, each having an amplitude varying in a predetermined relation with time during the corresponding timing pulse; means responsive to said time-varying signals and to the first signal to occur during the corresponding reception interval at said output circuit portion of said second gate circuit for deriving an output pulse during each corresponding reception interval having an amplitude representative of the time lapse between initiation of each timing pulse and said signal at said output circuit portion of said second gate circuit; and utilization means responsive to the amplitude of said output pulses, and arranged to provide an indication thereof.

5. Ultrasonic inspection apparatus comprising: pulser means for deriving electrical signal pulses during repetitive intervals spaced in time from one another by reception intervals; a search unit including transducer means electrically coupled to said pulser means for converting the aforesaid electrical signal pulses to ultrasonic wave energy pulses propagating from a surface thereof and for converting ultrasonic wave energy pulses incident on said surface to electrical signal pulses and including an acoustic delay element having one surface acoustically coupled to the aforesaid surface of said transducer means and another surface adapted to be acoustically coupled to an object undergoing inspection; first and second gate circuits, each including input, output and control circuit portions and being normally inoperative to translate electrical signals between said input and said output circuit portions, but adapted to be operatively conditioned in response to an electrical signal at said control circuit portion; means for supplying a replica of electrical signal pulses derived by said transducer means to said input circuit portion of each of said gate circuits; means for deriving first control pulses initiated in synchronism with the electrical signal pulses from said pulser means for application to said control circuit portion of said first gate circuit, each occurring substantially only during one of said reception intervals; timing pulse means responsive to the first electrical signal pulse to occur during each of said reception intervals at said output circuit portion of said first gate circuit for deriving timing pulses each initiated in synchronism with the aforesaid first electrical signal pulse and terminating during the corresponding reception interval; means including electrical delay means connected to the output of said timing pulse means for deriving additional control pulses, each initiated at a time delayed from a corresponding one of said first electrical signal pulses by a selected interval and terminating during the corresponding reception interval; means for supplying said additional control pulses to said control circuit portion of said second gate circuit; means responsive to electrical pulses at said output circuit portion of said second gate circuit for deriving corresponding pulses having the same timing relation, but of essentially fixed amplitude; means responsive to said timing pulses for deriving a sequence of time-varying signals, each having an amplitude varying in a predetermined relation with time during the corresponding timing pulse; coincidence means responsive to said time-varying signals and to said corresponding pulses for deriving output pulses during reception intervals having amplitude representative of the times of occurrence of said corresponding pulses; and utilization means responsive to the amplitude of the first of said corresponding pulses to occur during each of said reception intervals to provide an indication thereof.

6. Ultrasonic inspection apparatus comprising: pulser means for deriving electrical signal pulses during repetitive intervals spaced in time from one another by reception intervals; a search unit including transducer means electrically coupled to said pulser means for converting the aforesaid electrical signal pulses to ultrasonic wave energy pulses propagating from a surface thereof and for converting ultrasonic wave energy pulses incident on said surface to electrical signal pulses and including an acoustic delay element having one surface acoustically coupled to the aforesaid surface of said transducer means and another surface adapted to be acoustically coupled to an object undergoing inspection; first and second gate circuits, each including input, output and control circuit portions and being normally inoperative to translate electrical signals between said input and said output circuit portions, but adapted to be operatively conditioned in response to an electrical signal at said control circuit portion; means for supplying a replica of electrical signal pulses derived by said transducer means to said input circuit portion of each of said gate circuits; means for deriving first control pulses initiated in synchronism with the electrical signal pulses from said pulser means for application to said control circuit portion of said first gate circuit, each occurring substantially only during one of said reception intervals; timing pulse means responsive to the first electrical signal pulse to occur during each of said reception intervals at said output circuit portion of said first gate circuit for deriving timing pulses each initiated in synchronism with the aforesaid first electrical signal pulse and terminating during the corresponding reception interval; means including electrical delay means connected to the output of said timing pulse means for deriving additional control pulses, each initiated at a time delayed from a corresponding one of said first electrical signal pulses by a selected interval and terminating during the corresponding reception interval; means for supplying said additional control pulses to said control circuit portion of said second gate circuit; means responsive to said timing pulses for deriving a sequence of time-varying signals, each having an amplitude varying in a predetermined relation with time during the corresponding timing pulse; means responsive to said time-varying signals and to the first signal to occur during the corresponding reception interval at said output circuit portion of said second gate circuit for deriving an output pulse during each corresponding reception interval having an amplitude representative of the time occurrence of said signal at said output circuit portion of said second gate circuit; a pulse-stretcher coupled to said last-mentioned means for deriving an output signal of essentially continuous duration having an amplitude corresponding to the amplitude of said output pulses; and utilization means responsive to the amplitude of said output signal to provide an indication thereof.

7. Ultrasonic inspection apparatus comprising: pulser means for deriving electrical signal pulses during repetitive intervals spaced in time from one another by reception intervals; a search unit including transducer means electrically coupled to said pulser means for converting the aforesaid electrical signal pulses to ultrasonic wave energy pulses propagating from a surface thereof and for converting ultrasonic wave energy pulses incident on said surface to electrical signal pulses and including an acoustic delay element having one surface acoustically coupled to the aforesaid surface of said transducer means and another surface adapted to be acoustically coupled to an object undergoing inspection; first and second gate circuits, each including input, output and control circuit portions and being normally inoperative to translate electrical signals between said input and said output circuit portions, but adapted to be operatively conditioned in response to an electrical signal at said control circuit portion; means for supplying a replica of electrical signal pulses derived by said transducer means to said input circuit portion of each of said gate circuits; means for deriving first control pulses initiated in synchronism with the electrical signal pulses from said pulser means for application to said control circuit portion of said first gate circuit, each occurring substantially only during one of said reception intervals; means responsive to the first electrical signal pulse to occur during each of said reception intervals at said output circuit portion of said first gate circuit for deriving time varying pulses each initiated in synchronism with the aforesaid first electrical signal pulse and terminating during the corresponding reception interval; means including electrical delay means connected to the output of said first gate circuit for deriving additional control pulses, each initiated at a time delayed from a corresponding one of said first electrical signal pulses by a selected interval and terminating during the corresponding reception interval; means for supplying said additional control pulses to said control circuit portion of said second gate circuit; means responsive to said time-varying pulses and to electrical pulses occurring during the corresponding reception interval at said output circuit portion of said second gate circuit for deriving output pulses during each corresponding reception interval having amplitudes representative of the time occurrence of said electrical pulses at said output circuit portion of said second gate circuit; a pulse selector circuit including a signal translator coupled to said last-mentioned means adapted to be rendered inoperative to translate signals with the application of a control potential, at least one pulse stretcher coupled to said signal translator, an output stage coupled to said pulse stretcher, and a degenerative feed-back circuit extending from said output stage to said signal translator to provide the aforesaid control potential, said control potential having an amplitude corresponding to the amplitude of said output pulses, but changing to a value below that necessary to diasble said signal translator prior to the occurrence of the first in each sequence of output pulses; and utilization means coupled to said output stage of said pulse selector and responsive to the amplitude of signal voltages at said output stage to provide an indication thereof.

8. Ultrasonic inspection apparatus comprising: pulser means for deriving electrical signal pulses during repetitive intervals spaced in time from one another by reception intervals; transducer means electrically coupled to said pulser means for converting the aforesaid electrical signal pulses to ultrasonic wave energy pulses propagating from a surface thereof and for converting ultrasonic wave energy pulses incident on said surface to a series of electrical signal pulses; means for deriving a replica of said series of electrical signal pulses derived by said transducer means during each of said reception intervals; means responsive to said replica of said electrical signal pulses for deriving output pulses during each corresponding reception interval having amplitude representative of the times of occurrence of the second and later of said series of pulses in said replica of said series of electrical signal pulses; a signal translator supplied with said output pulses adapted to be rendered inoperative to translate signals with the application of a control potential; at least one pulse stretcher coupled to said signal translator; an output stage coupled to said pulse stretcher; a degenerative feed-back circuit extending from said output stage to said signal translator to provide the aforesaid control potential, said control potential having an amplitude corresponding to the amplitude of said output pulses, but changing to a value below that necessary to disable said signal translator prior to the occurrence of the first in each sequence of output pulses; and utilization means coupled to said output stage and responsive to the amplitude of signal voltages at said output stage to provide an indication thereof.

9. Ultrasonic inspection apparatus comprising: pulser means for deriving electrical signal pulses during repetitive intervals spaced in time from one another by reception intervals; transducer means electrically coupled to said pulser means for converting the aforesaid electrical signal pulses to ultrasonic wave energy pulses propagating from a surface thereof and for converting ultrasonic wave energy pulses incident on said surface to a series of electrical signal pulses; means for deriving a replica of said series of electrical signal pulses derived by said transducer means during each of said reception intervals; means responsive to said replica of said electrical signal pulses for deriving output pulses during each corresponding reception interval having amplitudes representative of the times of occurrence of the second and later of said series of pulses in said replica of said series of electrical signal pulses; a signal translator adapted to be rendered inoperative to translate signals with the application of a control potential; a capacitive-type peak-reading circuit coupled to said signal translator; a output stage coupled to said peak reading circuit; a degenerative feed-back circuit extending from said output stage to said signal translator to provide the aforesaid control potential, said peak-reading circuit having a time constant such that said control potential has an amplitude corresponding to the amplitude of said output pulses, but changes to a value below that necessary to disable said signal translator prior to the occurrence of the first in each sequence of output pulses; and utilization means coupled to said output stage and responsive to the amplitude of signal voltages at said output stage to provide an indication thereof.

References Cited in the file of this patent
UNITED STATES PATENTS

| | | |
|---|---|---|
| 2,574,596 | Slaymaker | Nov. 13, 1951 |
| 2,888,824 | Henry | June 2, 1959 |